US007448257B2

(12) United States Patent
Kimura

(10) Patent No.: US 7,448,257 B2
(45) Date of Patent: *Nov. 11, 2008

(54) LEAK CHECK APPARATUS FOR FUEL VAPOR PROCESSING APPARATUS

(75) Inventor: Tamikazu Kimura, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 79 days.

This patent is subject to a terminal disclaimer.

(21) Appl. No.: 11/602,945

(22) Filed: Nov. 21, 2006

(65) Prior Publication Data

US 2007/0113633 A1 May 24, 2007

(30) Foreign Application Priority Data

Nov. 22, 2005 (JP) ............................ 2005-336862

(51) Int. Cl.
*G01M 15/00* (2006.01)

(52) U.S. Cl. .................................... 73/49.7; 73/114.39

(58) Field of Classification Search ..................... 73/40, 73/46, 47, 49.7, 116, 117.2, 117.3, 118.1, 73/114.38, 114.39
See application file for complete search history.

(56) References Cited

U.S. PATENT DOCUMENTS

| | | | | |
|---|---|---|---|---|
| 5,450,834 | A | 9/1995 | Yamanaka et al. | |
| 5,460,143 | A | 10/1995 | Narita | |
| 6,164,123 | A | 12/2000 | Corkill | |
| 6,276,343 | B1 | 8/2001 | Kawamura et al. | |
| 6,367,458 | B1 | 4/2002 | Furusho et al. | |
| 6,474,148 | B2 * | 11/2002 | Takagi et al. | 73/118.1 |
| 6,523,398 | B1 * | 2/2003 | Hanai et al. | 73/118.1 |
| 6,804,995 | B2 | 10/2004 | Kawano | |
| 6,950,742 | B2 | 9/2005 | Yamaguchi et al. | |
| 6,965,825 | B2 | 11/2005 | Hosoya et al. | |
| 6,986,341 | B2 | 1/2006 | Mitani et al. | |
| 7,290,535 | B2 * | 11/2007 | Kimura | 123/520 |
| 2001/0027682 | A1 * | 10/2001 | Takagi et al. | 73/118.1 |
| 2001/0054415 | A1 | 12/2001 | Hanai et al. | |
| 2002/0046609 | A1 | 4/2002 | Ito | |
| 2004/0154596 | A1 * | 8/2004 | Mitani et al. | 123/509 |
| 2006/0137437 | A1 * | 6/2006 | Tsuyuki et al. | 73/118.1 |
| 2007/0113634 | A1 * | 5/2007 | Kimura | 73/118.1 |

FOREIGN PATENT DOCUMENTS

| | | |
|---|---|---|
| JP | 06-173789 | 6/1994 |

* cited by examiner

*Primary Examiner*—Eric S McCall
(74) *Attorney, Agent, or Firm*—Young Basile

(57) ABSTRACT

A leak check apparatus performs a leak check of a fuel vapor processing apparatus based on a change in a negative pressure in a purge line during leak down. The pressure change during leak down is corrected by measuring an amount of vapor generated after the purge line is opened to the atmosphere. A first pressure change rate of the purge line is measured after a predetermined negative pressure is applied to the purge line, and the purge line is sealed at the negative pressure. A second pressure change rate of the purge line is measured after the first pressure change rate of the purge line is measured, the cut valve is opened to expose the purge line to the atmosphere, and the purge valve and the cut valve are closed to seal the purge line at the atmospheric pressure. The second pressure change rate measurement does not begin until the degree of pressure increase in the purge line exceeds a predetermined reference value.

16 Claims, 3 Drawing Sheets

LEAK CHECK APPARATUS FOR FUEL VAPOR PROCESSING APPARATUS

CROSS-REFERENCES TO RELATED APPLICATIONS

This application claims priority from Japanese Patent Application Serial No. 2005-336862, filed on Nov. 22, 2005, which is incorporated herein in its entirety by reference.

TECHNICAL FIELD

The invention relates in general to a leak check apparatus and method for a fuel vapor processing apparatus of an internal combustion engine.

BACKGROUND

In general, an internal combustion engine has a fuel vapor processing apparatus for preventing fuel vapor generated in a fuel tank from being dissipated into the atmosphere. The fuel vapor processing apparatus guides the fuel vapor to a canister, where the fuel vapor is temporarily adsorbed, and causes an intake system of the internal combustion engine to take in the fuel vapor adsorbed in the canister via a purge valve together with fresh air introduced through a fresh air inlet.

In such a fuel vapor processing apparatus, if a crack is formed in a purge line that extends from the fuel tank to the purge valve through the canister, or if a seal failure occurs in the purge line, a leakage of the fuel vapor occurs. The expected dissipation prevention effect cannot be obtained.

There are known devices for processing fuel vapor. For example in Japanese Laid-Open Patent Application Publication No. (Tokkaihei) 6-173789, a leak check apparatus is used for checking whether or not the fuel vapor is leaking from the purge line based on a detected pressure change. This apparatus performs an operation called leak-down detection. In the leak-down detection, basically, the purge line is sealed after a predetermined negative pressure is applied thereto, and the presence or absence of a leakage is determined on the basis of a change in the inner pressure of the purge line. Since evaporation of fuel in the fuel tank continues after the purge line is sealed and the inner pressure changes accordingly, the leak detection accuracy is increased by correcting the pressure change during leak down on the basis of the generation speed of the fuel vapor, which is measured by performing an operation called vapor monitoring. In vapor monitoring, the inner pressure of the purge line is returned to atmospheric pressure after the measurement of change in the negative pressure during leak down, and then the purge line is sealed again to enable detection of an increase in the inner pressure from the atmospheric pressure.

BRIEF SUMMARY

The leak check apparatus according to one example of the invention includes a canister having an air inlet opening. The canister temporarily adsorbs fuel vapor produced in a fuel tank. The leak check apparatus also includes a fuel vapor passage extending from the fuel tank to the canister and a purge passage extending from the canister to an intake system of an internal combustion engine. The purge passage is opened and closed by a purge valve, and the air inlet of the canister is opened and closed by a cut valve. The leak check apparatus also includes a leak check control unit for checking a fuel vapor leak in a purge line extending from the fuel tank to the purge valve through the canister. The leak check control unit is operable to detect pressure in the purge line, measure a first pressure change rate of the purge line, measure a second pressure change rate of the purge line, the second pressure change rate being measured after the first pressure change rate of the purge line is measured, and determine the degree of leak based on a difference between the first pressure change rate and the second pressure change rate. The first pressure change rate is measured after a predetermined negative pressure is applied to the purge line, and the purge line is sealed at the negative pressure. The second pressure change rate is measured after the first pressure change rate of the purge line is measured, the purge line is exposed to the atmosphere by opening the cut valve, and the purge line is sealed at the atmospheric pressure. The second pressure change rate measurement begins when a degree of pressure increase in the purge line after the purge line is sealed exceeds a predetermined reference value.

Another example of a leak check apparatus for an internal combustion engine taught herein includes a canister having an air inlet opening, the canister temporarily adsorbing fuel vapor produced in a fuel tank, a fuel vapor passage extending from the fuel tank to the canister and a purge line extending from the fuel tank to a purge valve through the canister. The apparatus also includes means for detecting pressure in the purge line, means for measuring a first pressure change rate of the purge line, means for measuring a second pressure change rate of the purge line after measuring the first pressure change rate and after a degree of pressure increase in the purge line exceeds a predetermined reference pressure and means for determining a degree of leak based on a difference between the first pressure change rate and the second pressure change rate.

Methods of checking a fuel vapor leak are also taught herein. For example, a method for checking a fuel vapor leak taught herein comprises applying a predetermined negative pressure to the purge line, sealing the purge line at the negative pressure, measuring a first pressure change rate of the purge line, exposing the purge line to atmospheric air, sealing the purge line at atmospheric pressure, measuring a second pressure change rate of the purge line and determining the degree of leak based on a difference between the first pressure change rate and the second pressure change rate. The measurement of the second pressure change rate begins when a degree of pressure increase in the purge line after the purge line is sealed exceeds a predetermined reference value.

BRIEF DESCRIPTION OF THE DRAWINGS

The description herein makes reference to the accompanying drawings wherein like reference numerals refer to like parts throughout the-several-views, and wherein.

DETAILED DESCRIPTION OF EMBODIMENTS OF THE INVENTION

With the leak diagnosis apparatus described above, the fuel tank is deformed due to negative pressure when the negative pressure is applied to the purge line, and the accuracy of leak detection is affected by the fuel tank attempting to return to its original shape. The influence of deformation of the fuel tank is small during leak down since the change in the inner pressure is measured while the negative pressure is applied to the purge line. However, in vapor monitoring the inner pressure of the purge line must be initialized to atmospheric pressure in order to accurately measure the amount of vapor generated. Accordingly, if the deformation of the fuel tank remains during initialization of the purge line, the pressure increase caused by the evaporation of fuel and a negative pressure generated as the tank returns to its original shape cancel each other, making it difficult to accurately detect the amount of generated fuel vapor. As a result, the diameter of a leak hole is evaluated to be larger than it actually is in the leak check result.

According to embodiments of the leak check apparatus disclosed herein, the leak check apparatus is used in a fuel vapor processing apparatus, which guides fuel vapor generated in a fuel tank to a canister having an air inlet so that the fuel vapor is temporarily adsorbed in the canister. The fuel vapor processing apparatus causes an intake system of an internal combustion engine to take in the fuel vapor adsorbed in the canister via a purge valve together with fresh air introduced through the air inlet. The leak check apparatus checks a leakage of the fuel vapor from a purge line that extends from the fuel tank to the purge valve through the canister. That is, the purge line is a closed space formed by interior space of components that enclose the fuel vapor, for example, the interior space of the fuel tank and the canister.

Figure 1:
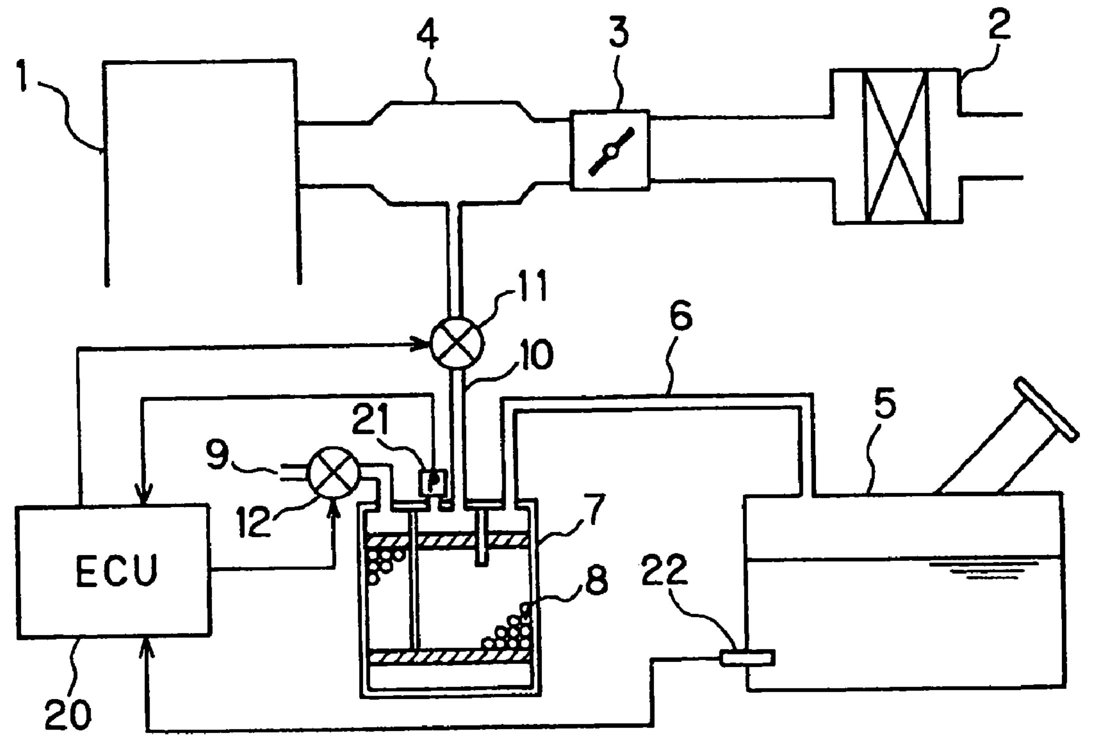
FIG. 1 is a system diagram illustrating an example of the invention.

FIG. 1 is a system diagram illustrating an example of a leak check apparatus for a fuel vapor processing apparatus of an internal combustion engine 1. An intake system of the internal combustion engine 1 includes an air cleaner 2, a throttle valve 3 and an intake manifold 4 arranged in this order from the upstream side. Fuel is supplied via a fuel injection valve (not shown) provided on each cylinder.

A fuel vapor processing apparatus includes a canister 7 in which fuel vapor that is generated in a fuel tank 5 and guided though a fuel vapor guide passage 6 is temporarily adsorbed. The canister 7 is a container filled with an adsorbent 8, such as activated carbon.

The canister 7 has an air inlet (atmospheric opening) 9 and a purge passage 10 extending from the canister 7. The purge passage 10 extends through a purge valve 11 and is connected to the intake manifold 4, which is positioned downstream of the throttle valve 3. The purge valve 11 opens in response to a signal output from a control unit, such as an engine control unit (referred hereafter as ECU) 20.

The fuel vapor generated in the fuel tank 5 when, for example, the internal combustion engine 1 is stopped is guided to the canister 7 through the fuel vapor guide passage 6 and is adsorbed in the canister 7. When the internal combustion engine 1 is started, and predetermined conditions for allowing purging are satisfied, the purge valve 11 is opened. An intake of negative pressure of the internal combustion engine 1 is applied to the canister 7. Accordingly, the fuel vapor adsorbed in the canister 7 is removed from the canister 7 by fresh air that flows through the air inlet 9. The purge gas including the removed fuel vapor is injected into the intake manifold 4 through the purge passage 10. The purge gas is then combusted in a combustion chamber of the internal combustion engine 1.

A leak check apparatus for the fuel vapor processing apparatus includes a cut valve 12 that enables opening and closing of the air inlet 9 of the canister 7.

According to an example of the invention, the ECU 20 performs the functions for measuring a first pressure change rate, measuring a second pressure-change rate and determining an existence of a leak. The ECU 20 performs a leak check while controlling the open and closed states of the purge valve 11 and the cut valve 12 under predetermined leak check conditions. To perform the leak check, the ECU 20 receives signals from a pressure sensor 21, which functions to detect pressure, and a fuel temperature sensor 22, which functions to detect fuel temperature.

The pressure sensor 21 is provided on the canister 7 to detect a pressure in the purge line, which extends from the fuel tank 5 to the purge valve 11 through the canister 7. Hence, in this example, the purge line is formed by the interior space of the fuel tank 5, the fuel vapor passage 6, the canister 7 and a part of the purge passage 10 (between the canister 7 and the purge valve 11). The fuel temperature sensor 22 is provided on the fuel tank 5 to detect the fuel temperature in the tank 5.

Figure 2:
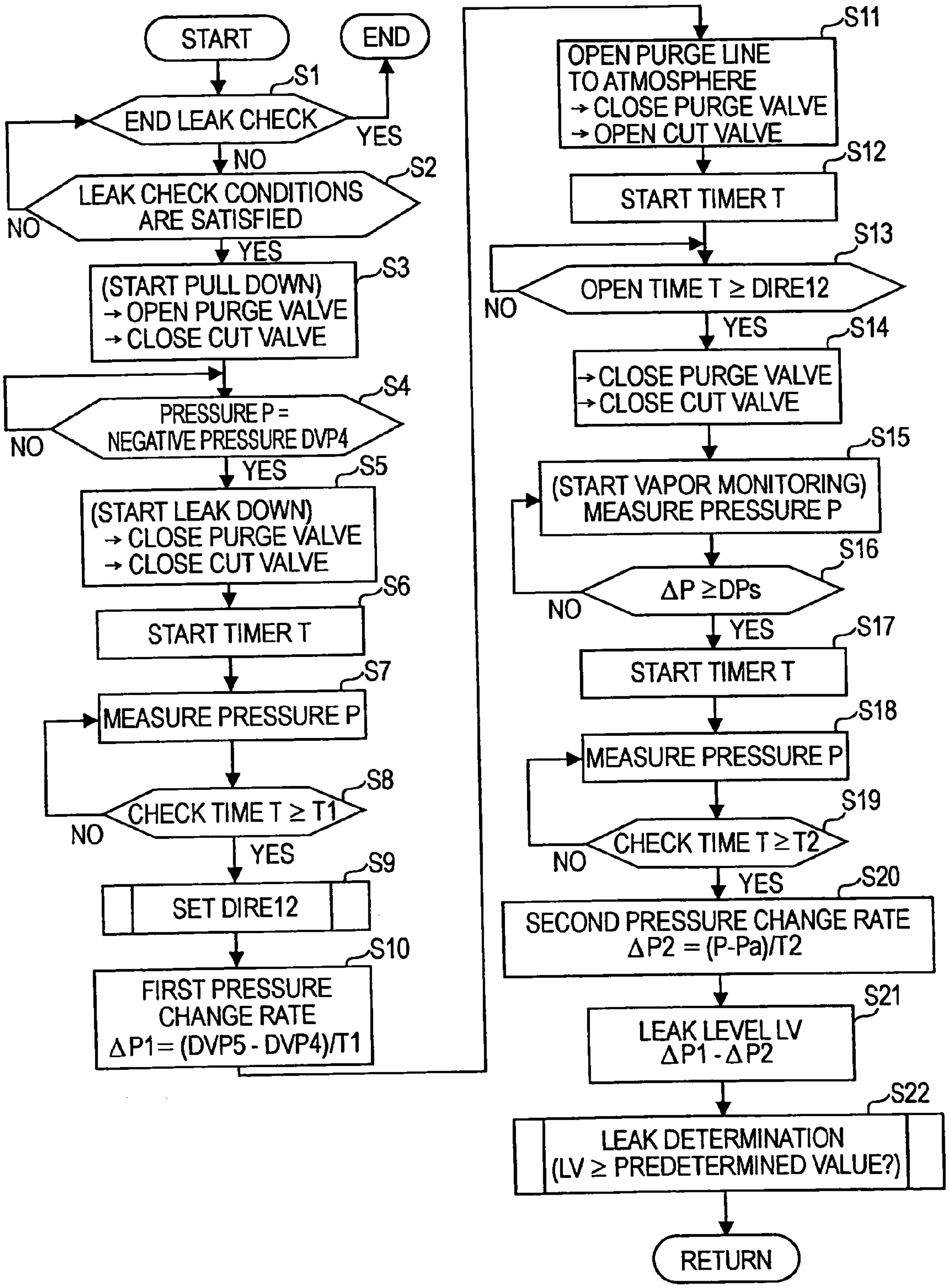
FIG. 2 is a flowchart illustrating a leak check process of the invention.

The operation of the leak check of the fuel vapor processing apparatus is performed as described below with reference to the flowchart illustrated in FIG. 2 and the time chart illustrated in FIG. 3. The leak check of the fuel vapor processing apparatus can be performed by any control unit, for example, like the ECU 20 shown or a standard engine microcontroller that includes a central processing unit (CPU), random access memory and read only memory and that can receive and send input/output signals as discussed in more detail below. The processing parts (e.g., programming instructions) described herein are generally stored in memory, and the functions of each of the parts is performed by the logic of the CPU. Of course, the controller that performs the functions of each of the parts described herein could also be part of the dedicated microcontroller or could be a microprocessor using external memory.

In step (denoted as S hereafter) 1 a query occurs as to whether or not the leak check is completed. If the leak check is not completed, the process proceeds to S2. If the leak check is completed, the process ends.

In S2 a next query asks whether predetermined leak check conditions are satisfied. More specifically, based on the operational conditions and the operational history, it is determined that the leak check conditions are satisfied if purging of the fuel vapor can be stopped, there is no influence of sloshing of fuel (excessive vaporization due to vibration), and the negative pressure can be obtained in the intake system. The operation will not proceed to S3 until the leak check conditions are satisfied.

In S3 a pull down operation for applying a negative pressure to the purge line is performed. During the pull down operation the purge valve 11 is opened, and the cut valve 12 is closed (point A in FIG. 3).

In the next step, S4, the pressure P in the purge line detected by the pressure sensor 21 is read, and a determination is made as to whether the pressure P has reached a predetermined check-start negative pressure DVP4. When the pressure P reaches the check-start negative pressure DVP4, the process proceeds to S5 and the following steps, where a check operation is performed.

Leak down starts at S5. More specifically, a first pressure change rate for the leak check (the above-described leak-down operation) is measured. The purge valve 11 is closed while the cut valve 12 is maintained closed (point B in FIG. 3). Thus, the purge line is sealed at a negative pressure. Then, the pressure in the purge line is gradually increased depending on the degree of leakage from the purge line (leak-hole diameter) and the amount of fuel vapor produced.

In S6 a check time timer is reset to start time measurement from the time that the check is started.

In S7 the pressure P in the purge line detected by the pressure sensor 21 is read as part of the check operation.

In S8 a determination is made as to whether the check time T counted by the check time timer has reached a preset leak down time T1. If the check time has not reached a preset leak down time, the process returns to S7. During the check operation, S7 and S8 are repeated until the time elapsed since the start of the leak down operation, which is the check time T, reaches or exceeds the preset time T1 (point C in FIG. 3). Then the leak down operation is finished, and the process proceeds to S9.

In S9 a delay time DIRE12 is set before starting measurement of a second pressure change rate (the above-described vapor monitoring operation). The delay time DIRE12 can be a fixed value, but may also be set as a variable that is determined based on the amount of deformation of the fuel tank or the inner pressure.

In S10 an amount of pressure change during the leak down operation is derived by subtracting the check starting pressure DVP4, which is the pressure at the start of measurement, from the pressure DVP5 at the end of the measurement. Then the pressure change is divided by the check time T1 to obtain the first pressure change rate ΔP1 according to:

$$\Delta P1=(\mathrm{DVP5}-\mathrm{DVP4})/T1 \quad (1)$$

This value depends on the degree of leakage and the amount of fuel vapor produced.

In S11 the purge line is exposed to atmospheric conditions by opening the cut valve 12 and keeping the purge valve 11 closed. In S12 the timer is reset at the time when the purge line is opened to the atmosphere. Then, in S13, a query is made as to whether or not the time elapsed from the time when the purge line was opened to the atmosphere has reached the set delay time DIRE12. When the timer value T reaches or exceeds DIRE12, the process proceeds to S14 (point D' in FIG. 3).

In S14 the cut valve 12 is closed. The purge valve 11 is kept closed. Preparation for vapor monitoring for measuring the second pressure change rate is started. The purge line is sealed at the atmospheric pressure, and the pressure in the purge line is gradually increased according to the amount of fuel vapor that is produced.

In S15 the pressure P is measured and the change rate ΔP per unit of time is calculated. Then, in S16, a query is made as to whether or not ΔP has reached a predetermined reference value DPs. The change rate ΔP is used to determine the increasing tendency of the inner pressure of the purge line. Therefore, the above-mentioned unit time is not only set to be considerably smaller than a measurement time T2 of the second pressure change rate, but is also set sufficiently small within a range where the increasing tendency of the inner pressure can be determined. When $\Delta P \geqq DPs$ is satisfied, the process proceeds to S17 and the following steps, where a vapor monitoring operation, that is, measurement of the second pressure change rate, is performed (point D in FIG. 3).

In S17 the timer T is reset for measuring the vapor monitoring time from the time that the monitoring is started.

In S18 the pressure P of the purge line detected by the pressure sensor 21 is read, and in S19 a determination is made as to whether the check time T measured by the timer has reached or exceeded a predetermined check time T2. If the check time T has not reached the predetermine check time T2, the process returns to S18. During the check operation, S18 and S19 are repeated until the check time reaches or exceeds T2 (point E in FIG. 3). Once this occurs, the process proceeds to S20.

In S20, the amount of pressure change during the check time is derived by subtracting the pressure (atmospheric pressure) Pa at the start of measurement from the pressure P at the end of the measurement. Then, the pressure change is divided by the check time T2 to obtain the second pressure change rate ΔP2. This value depends only on the amount of fuel vapor produced.

Then, in S21 the second pressure change rate ΔP2 is subtracted from the first pressure change rate ΔP1 to determine a leak level LV, which is a pressure change rate that depends only on the degree of leakage (leak hole diameter).

In S22 the leak level LV is compared with a predetermined value to determine whether a leak is present. If the leak level LV is equal to or greater than the predetermined value, a leak is present. If the leak level LV is less than the predetermined value, a leak is not present.

Although not shown in the flowchart, after the check operation, the purge valve 11 is opened or closed depending on whether purging is requested, and the cut valve 12 is opened.

In the above-described vapor monitoring operation, a delay time DIRE12 is set so that the measurement of the pressure change rate performed in S17 and the following steps is started after the pressure change rate per unit of time ΔP reaches the reference value DPs. Accordingly, the influence of the negative pressure caused by the deformation of the fuel tank 5 in the vapor monitoring operation can be eliminated, and the leak check can be accurately performed. This will be described in more detail with reference to FIG. 3.

Figure 3:
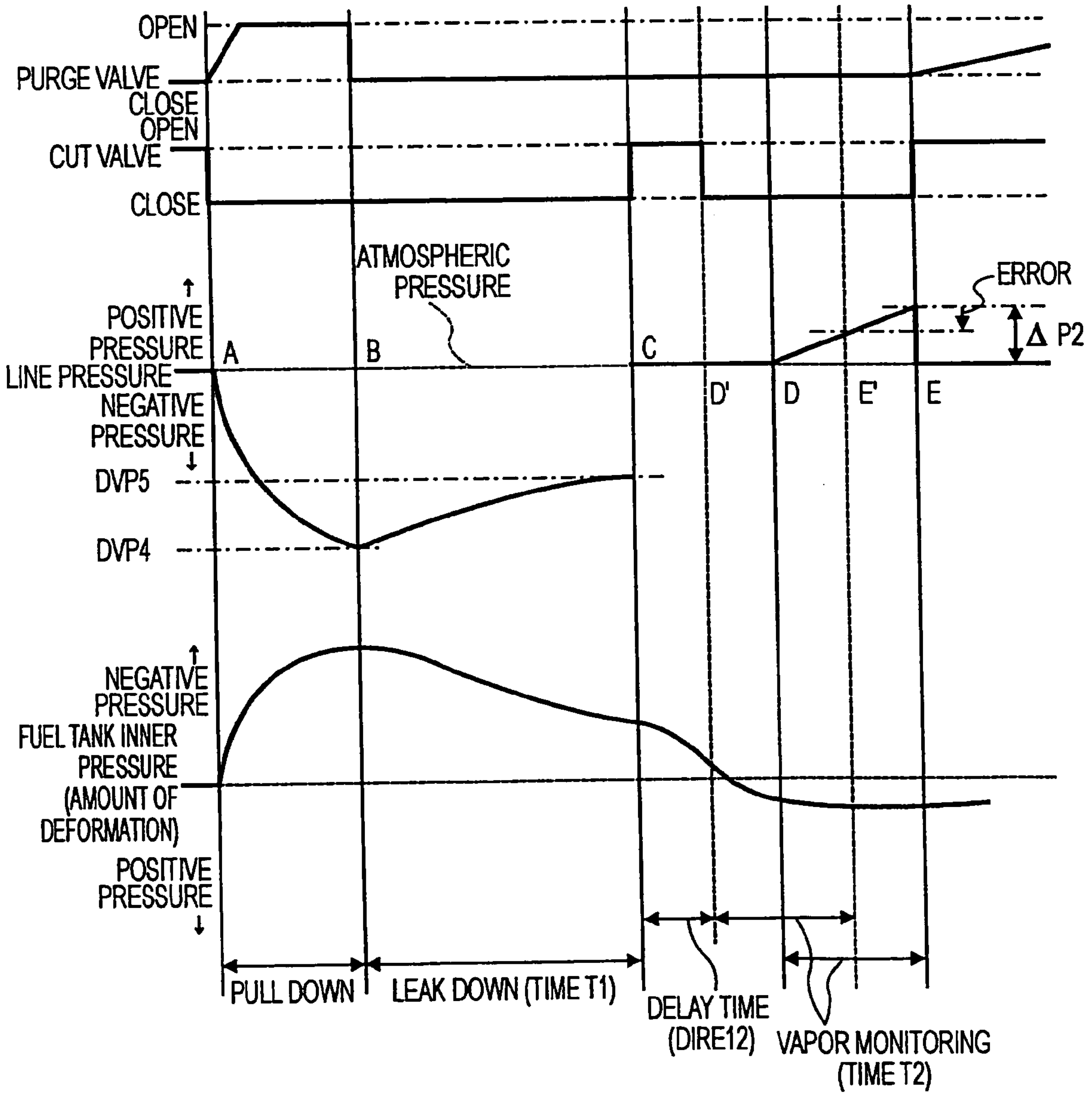
FIG. 3 is a time chart illustrating the leak check process of FIG. 2.

Referring to FIG. 3, when the atmospheric opening time DIRE12 elapses after the leak down is finished, the cut valve 12 is closed (point D'), and the purge line is resealed. During this time, if the fuel tank has not sufficiently recovered from deformation caused by contraction, a negative pressure caused by the restoring force serves to cancel a pressure increase caused by the fuel vapor. Accordingly, the pressure in the purge line becomes unstable and does not start to increase immediately. Therefore, for example, if the pressure measurement for vapor monitoring is started before the fuel tank has sufficiently recovered from deformation, the pressure at the time when vapor monitoring is finished, which is the pressure at the time after the lapse of the predetermined measurement time T2, becomes relatively low. As a result, the second pressure change rate ΔP2 includes an error and is smaller than the correct value. The characteristics between points D' and E' in FIG. 3 illustrates the case in which such an error occurs.

In comparison, according to embodiments of the invention, the increasing tendency of the pressure caused by the fuel vapor is detected based on the pressure change rate per unit of time ΔP in the purge line, and then vapor monitoring is started using the pressure at that time as the initial pressure (Pa). Therefore, an influence of the negative pressure caused by the deformation of the fuel tank is eliminated, and the second pressure change rate can be accurately measured. The characteristics according to this description are shown between points D to E in FIG. 3. Thus, according to embodiments of the invention, a high-accuracy check result can be obtained in the leak check using the second pressure change rate.

According to the above-described embodiment, the start of measurement of the second pressure change rate is determined based on the pressure change rate ΔP in the purge line. However, the criterion for determining the degree of pressure increase in the purge line is not limited to this. For example, a pressure value of the purge line may be detected, and the measurement of the second pressure change rate may be started when the pressure reaches a predetermined reference value, for example, the atmospheric pressure. Accordingly, the measurement of the second pressure change rate is started after the influence of the negative pressure caused by the contraction of the fuel tank is eliminated. Therefore, the result of leak check can be obtained irrespective of the deformation of the fuel tank, increasing the accuracy of the leak check.

Also, the above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A leak check apparatus for an internal combustion engine, the apparatus comprising:

a canister having an air inlet opening, the canister temporarily adsorbing fuel vapor produced in a fuel tank;

a fuel vapor passage extending from the fuel tank to the canister;

purge passage extending from the canister to an intake system of the internal combustion engine;

a purge valve for opening and closing the purge passage;

a cut valve for opening and closing the air inlet of the canister; and a leak check control unit for checking a fuel vapor leak in a purge line extending from the fuel tank to the purge valve through the canister, the leak check control unit operable to:

detect pressure in the purge line;

measure a first pressure change rate of the purge line after a predetermined negative pressure is applied to the purge line and the purge valve and cut valve are closed, sealing the purge line at the predetermined negative pressure;

measure a second pressure change rate of the purge line after measuring the first pressure change rate, opening the cut valve to expose the purge line to the atmospheric conditions and closing the purge valve and cut valve to seal the purge line at the atmospheric pressure, and after a degree of pressure increase in the purge line exceeds a predetenriined reference pressure; and determine a degree of leak based on a difference between the first pressure change rate and the second pressure change rate.

2. The apparatus according to claim 1 wherein the leak check control unit is further operable to:

detect a pressure change rate per unit time in the purge line as the degree of pressure increase.

3. The apparatus according to claim 1 wherein the leak check control unit is further operable to:

detect a pressure value in the purge line as the degree of pressure increase.

4. The apparatus according to claim 1 wherein the leak check control unit is further operable to:

close the purge valve and cut valve after the purge line is exposed to atmospheric conditions for a predetermined time period.

5. A leak check apparatus for an internal combustion engine, the apparatus comprising:

a canister having an air inlet opening, the canister temporarily adsorbing fuel vapor produced in a fuel tank;

a fuel vapor passage extending from the fuel tank to the canister;

purge line extending from the fuel tank to a purge valve through the canister;

means for detecting pressure in the purge line;

means for measuring a first pressure change rate of the purge line;

means for measuring a second pressure change rate of the purge line after measuring the first pressure change rate and after a degree of pressure increase in the purge line exceeds a predetermined reference pressure; and means for determining a degree of leak based on a difference between the first pressure change rate and the second pressure change rate.

6. The apparatus according to claim 5, further comprising:

means for detecting a pressure change rate per unit time in the purge line as the degree of pressure increase.

7. The apparatus according to claim 5, further comprising:

means for detecting a pressure value in the purge line as the degree of pressure increase.

8. The apparatus according to claim 5 wherein the means for measuring the first pressure change rate further comprises means for measuring the first pressure change rate after a predetermined negative pressure is applied to the purge line when the purge line and the air inlet opening are closed.

9. The apparatus according to claim 5, further comprising:

means for exposing the purge line to atmospheric conditions after measuring the first pressure change rate; and means for sealing the purge line at atmospheric pressure before measuring the second pressure change rate.

10. A method for checking a leak for use in a fuel vapor treatment device having a canister for absorbing fuel vapor directed from a fuel tank by a fuel vapor passage, the canister having an air inlet for receiving atmospheric air, the inlet opened and closed by a cut valve, and a purge line extending from the fuel tank to a purge valve through the canister, the method comprising:

applying a predetermined negative pressure to the purge line;

sealing the purge line at the predetermined negative pressure;

measuring a first pressure change rate of the purge line after sealing the purge line;

exposing the purge line to atmospheric air after measuring the first pressure change rate;

sealing the purge line at atmospheric pressure;

detecting a pressure increase in the purge line after sealing the purge line at the atmospheric pressure;

measuring a second pressure change rate of the purge line after a degree of pressure increase in the purge line exceeds a predetermined reference pressure; and determining a degree of leak based on a difference between the first pressure change rate and the second pressure change rate.

11. The method according to claim 10 wherein sealing the purge line at the negative pressure further comprises closing the purge valve.

12. The method according to claim 10 wherein exposing the purge line to the atmosphere further comprises opening the cut valve.

13. The method according to claim 10 wherein sealing the purge line at the atmospheric pressure further comprises closing the cut valve.

14. The method according to claim 10, further comprising:

detecting a pressure value in the purge line as the degree of pressure increase.

15. The method according to claim 10, further comprising:

detecting a pressure change rate per unit time in the purge line as the degree of pressure increase.

16. The method according to claim 10 wherein exposing the purge line to the atmospheric air further comprises exposing the purge line for a predetermined time period.

* * * * *